US009462593B2

(12) United States Patent
Tujkovic et al.

(10) Patent No.: US 9,462,593 B2
(45) Date of Patent: Oct. 4, 2016

(54) INTERFERENCE SUPPRESSION FOR CELLULAR NETWORKS

(71) Applicant: Broadcom Corporation, Irvine, CA (US)

(72) Inventors: Djordje Tujkovic, Mountain View, CA (US); Louay Jalloul, San Jose, CA (US); Amin Mobasher, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 70 days.

(21) Appl. No.: 13/838,387

(22) Filed: Mar. 15, 2013

(65) Prior Publication Data

US 2013/0294398 A1 Nov. 7, 2013

Related U.S. Application Data

(60) Provisional application No. 61/642,962, filed on May 4, 2012.

(51) Int. Cl.
*H04W 72/08* (2009.01)
*H04J 11/00* (2006.01)

(52) U.S. Cl.
CPC ........ *H04W 72/082* (2013.01); *H04J 11/0053* (2013.01)

(58) Field of Classification Search
None
See application file for complete search history.

(56) References Cited

U.S. PATENT DOCUMENTS

2007/0224935 A1* 9/2007 Waxman ............... H04L 5/0037
455/41.2
2008/0070510 A1* 3/2008 Doppler ............... H04B 17/345
455/69

(Continued)

FOREIGN PATENT DOCUMENTS

DE           EP2262336 A1 *  6/2009
DE           EP 2 262 336 A1 * 12/2010

(Continued)

OTHER PUBLICATIONS

European Search Report directed to related European Application No. 13002165.2, mailed on Jul. 22, 2013; 3 pages.

*Primary Examiner* — Charles C Jiang
*Assistant Examiner* — George Atkins, Jr.
(74) *Attorney, Agent, or Firm* — Sterne, Kessler, Goldstein & Fox P.L.L.C.

(57) ABSTRACT

A framework for enabling a user equipment (UE) to apply interference suppression processing during network conditions that are favorable to interference suppression or that are known is provided. The framework includes an interference suppression (IS) time and frequency (time/frequency) zone, which can be scheduled by a serving base station and signaled to the UE. In an embodiment, the serving base station coordinates with the interfering base station(s) to create a network condition favorable to interference suppression at the UE during the IS time/frequency zone. In another embodiment, the serving base station opportunistically schedules the IS time/frequency zone for the UE whenever it determines favorable transmission parameters being used or scheduled for use by the interfering base station(s). The UE applies interference suppression processing within the IS time/frequency zone, thereby improving receiver performance. Outside the time/frequency zone, the UE may disable interference suppression processing so as not to degrade receiver performance.

23 Claims, 7 Drawing Sheets

(56) References Cited

U.S. PATENT DOCUMENTS

| | | | |
|---|---|---|---|
| 2008/0260012 A1 | 10/2008 | Majonen et al. | |
| 2009/0264142 A1* | 10/2009 | Sankar | H04L 5/0007 455/501 |
| 2010/0009634 A1 | 1/2010 | Budianu et al. | |
| 2010/0080323 A1* | 4/2010 | Mueck | H04J 11/0033 375/296 |
| 2010/0216405 A1* | 8/2010 | Bhadra | H04W 52/241 455/63.1 |
| 2011/0044250 A1* | 2/2011 | Han | H04B 7/0689 370/328 |
| 2011/0189999 A1* | 8/2011 | Mueck | H04W 72/08 455/450 |
| 2011/0190024 A1* | 8/2011 | Seong | H04L 1/0069 455/522 |
| 2013/0295949 A1* | 11/2013 | Seo | H04J 11/005 455/452.1 |
| 2014/0092882 A1 | 4/2014 | Sankar et al. | |
| 2014/0241276 A1 | 8/2014 | Berberana et al. | |
| 2015/0078303 A1 | 3/2015 | Jöngren et al. | |

FOREIGN PATENT DOCUMENTS

| | | |
|---|---|---|
| EP | 2 262 336 A1 | 12/2010 |
| WO | WO 2010/124725 A1 | 11/2010 |
| WO | WO 2011/029458 A1 | 3/2011 |

* cited by examiner ial Application No. 61/642,962, filed May 4, 2012, which
INTERFERENCE SUPPRESSION FOR CELLULAR NETWORKS

CROSS-REFERENCE TO RELATED APPLICATIONS

The present invention claims the benefit of U.S. Provisional Application No. 61/642,962, filed May 4, 2012, which is incorporated herein by reference in its entirety.

BACKGROUND

1. Field of the Invention

The present disclosure relates generally to interference suppression in cellular networks.

2. Background Art

Wireless networks, such as cellular networks for example, are experiencing a significant increase in traffic demand. This makes interference management significantly important for adequate user experience.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In the following disclosure, terms defined by the Long-Term Evolution (LTE) standard are sometimes used. For example, the term "eNodeB" is used to refer to what is commonly described as a base station (BS) or base transceiver station (BTS) in other standards. The term is also used to refer to what is known as a relay or small cell transmitter in LTE standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other wireless communication standards.

Figure 1:
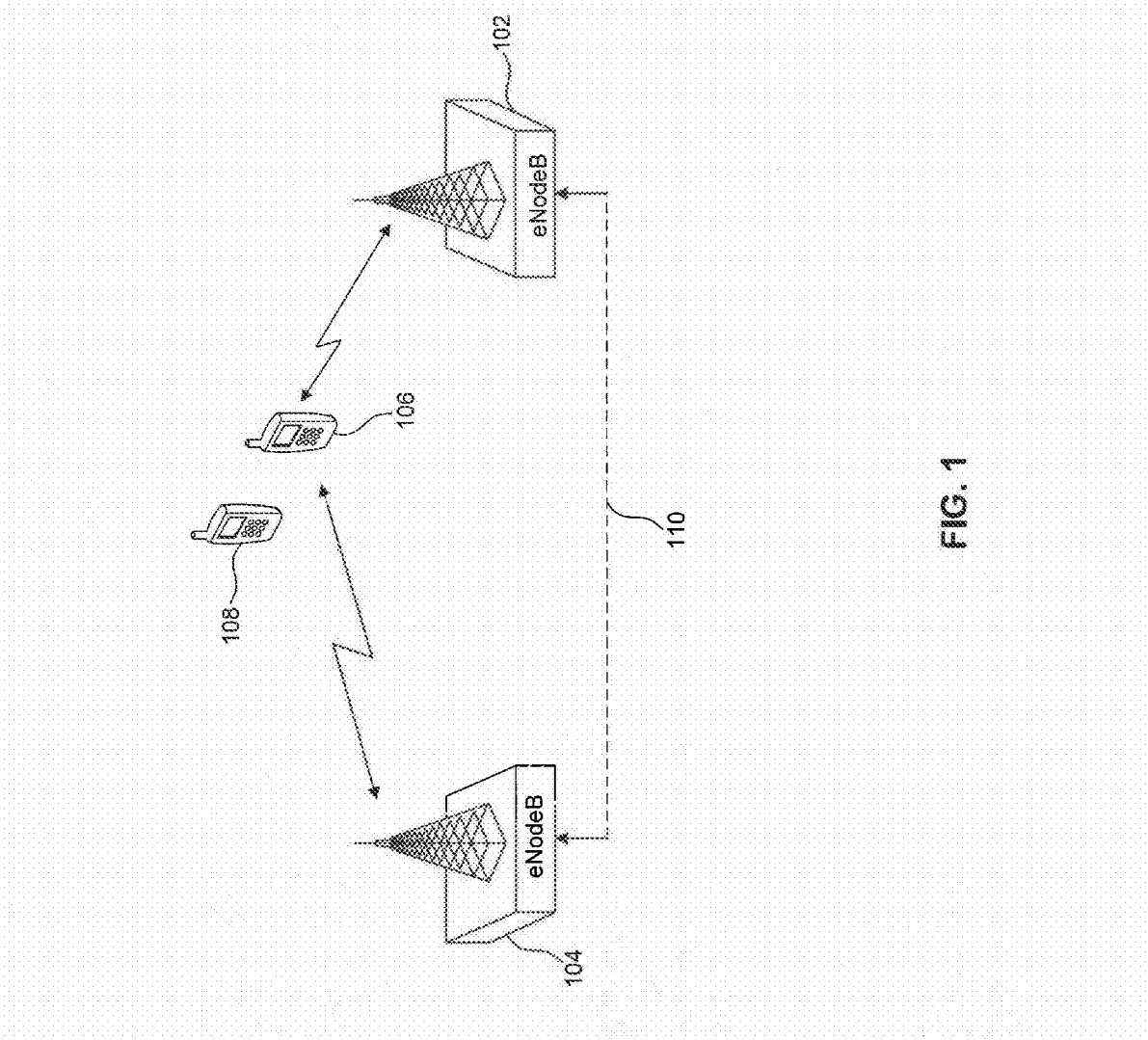
FIG. 1 illustrates an example cellular network environment.

FIG. 1 illustrates an example cellular network environment 100 in which embodiments can be used or implemented. Example cellular network environment 100 is provided for the purpose of illustration only and is not limiting of embodiments. As will be apparent to a person of skill in the art, embodiments are not limited to cellular networks and may be applied to other types of wireless communication networks.

As shown in FIG. 1, example network environment 100 includes an Evolved Node B (eNodeB) 102, an eNodeB 104, a User Equipment (UE) 106, and a UE 108. eNodeB 102 and eNodeB 104 may communicate via a backhaul network (e.g., X2 interface) link 110. UEs 106 and 108 can be any wireless device capable of cellular-based communication, including a cellular phone, tablet, laptop, etc. eNodeBs 102 and 104 may each support a plurality of serving cells (each serving cell is the equivalent of a base station and has a unique cell ID that identifies it to UEs). Depending on its receiver capabilities, UE 106 or UE 108 may communicate with one or more serving cells of eNodeB 102 and/or eNodeB 104.

For the purpose of illustration of embodiments, it is assumed that UE 106 is served by a first cell (base station) located at eNodeB 102, and that a second cell (base station) located at eNodeB 104 serves UE 108. It is further assumed that eNodeB 102 and eNodeB 104 are within the same geographical area such that signals transmitted from the second cell at eNodeB 104, for example to UE 108, may interfere with signals transmitted from the first cell at eNodeB 102 to UE 106, and/or vice versa. For example, eNodeB 102 and eNodeB 104 can be in nearby cells of a cellular network, within the same cell of the cellular network, or in nearby sectors of the same cell of the cellular network. Further, eNodeB 102 and eNodeB 104 can be part of a microcell, picocell, or femtocell network, located outdoor and/or indoor.

As would be understood by a person of skill in the art based on the teachings herein, embodiments are not limited by the above example scenario. In other embodiments, the interfering base station can be located at the same eNodeB (eNodeB 102) as the serving base station of UE 106. Further, embodiments can be extended to environments that include a plurality of interfering base stations (located at same or different eNodeBs) that interfere with the serving base station at UE 106.

Figure 2:
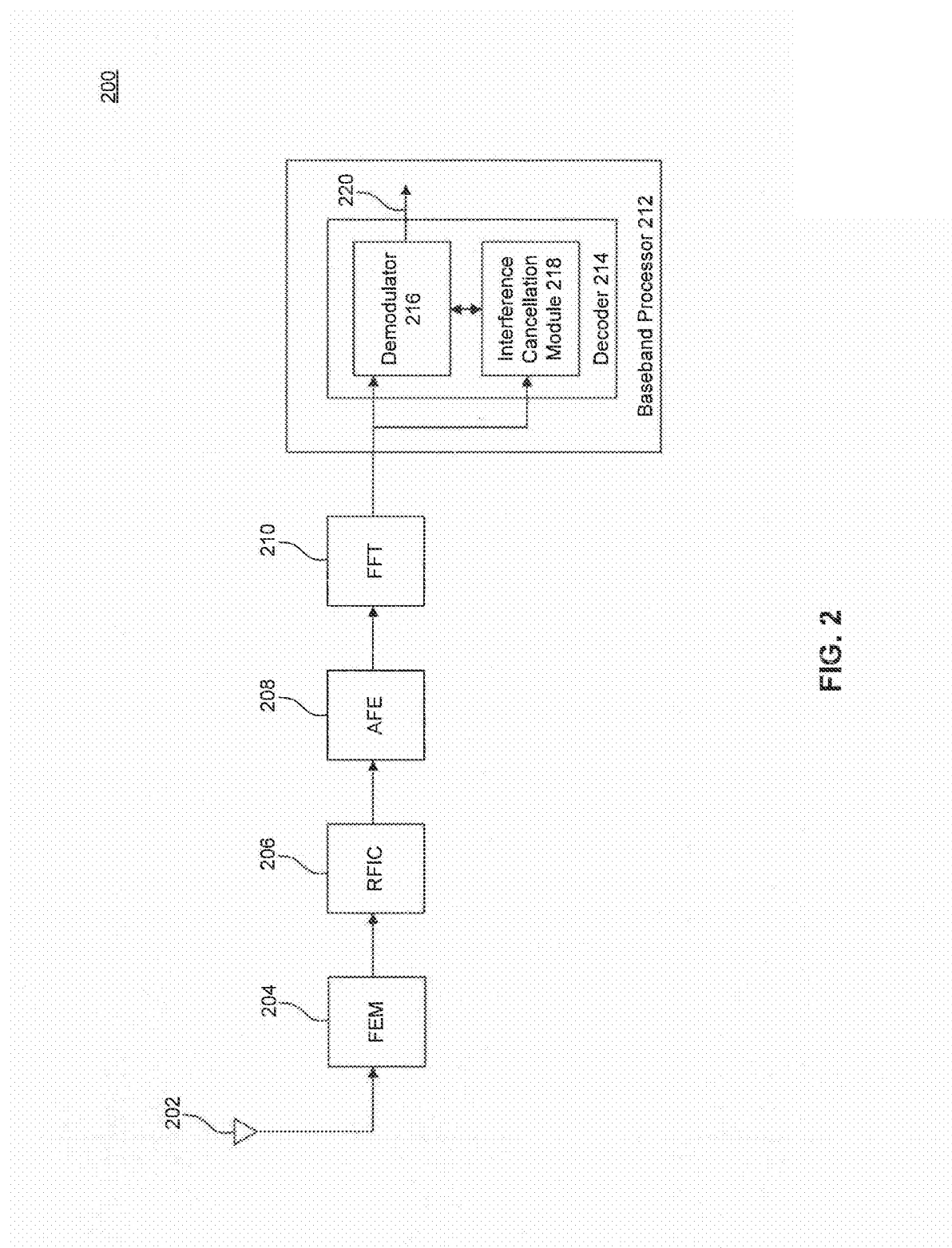
FIG. 2 illustrates an example receiver.

FIG. 2 illustrates an example receiver 200. Example receiver 200 is provided for the purpose of illustration only and is not limiting of embodiments. Example receiver 200 can be implemented in a UE, such as UE 106, for example, and can be used to receive Orthogonal Frequency Division Multiplexing (OFDM)-based signals.

As shown in FIG. 2, example receiver 200 includes a receive antenna 202, a front-end module (FEM) 204 (e.g., may include discrete components such as duplexers, switches, and filters), a radio frequency integrated circuit (RFIC) 206 (e.g., may include analog components such as mixers, low-pass filters, etc.), an analog front-end (AFE) 208 (e.g., may include mixed signal components such as digital-to-analog converters), a Fast Fourier Transform (FFT) module 210, and a baseband processor 212. Operation of FEM 204, RFIC 206, AFE 208, and FFT module 210 are well known in the art and are not described herein.

Baseband processor 212 includes, among other components, a decoder 214, which includes a demodulator 216 and an interference cancellation module 218. In another embodiment (not shown in FIG. 2), demodulator 216 and interference cancellation module 218 are combined in a single module, which performs the functions of both demodulator 216 and module 218. Demodulator 216 is configured to generate a data bit stream 220 based on the output of FFT module 210. Typically, the output of FFT module 210 includes a composite signal of a desired information signal and interference. Data bit stream 220 is representative of an estimate of the desired information signal. Demodulator 216 can be aided by interference cancellation module 218 to enhance data bit stream 220 by reducing or eliminating the interference in the composite signal used by demodulator 216 to generate data bit stream 220.

Interference cancellation module 218 may implement an interference cancellation technique, such as interference rejection combining (IRC), successive interference cancellation (SIC), and maximum likelihood (ML) interference cancellation, to name a few examples. In an embodiment, interference cancellation module 218 is configured to estimate the interference in the output of FFT module 210 and to provide the estimated interference to demodulator 216. Demodulator 216 uses the estimated interference from module 21$ to enhance the decoding performance of data bit stream 220. In an embodiment, interference cancellation module 218 is configured to decode the interference (e.g., generate a symbol stream representative of the interference) and to provide the decoded interference to demodulator 216. Demodulator 216 subtracts the decoded interference from the composite signal to generate data bit stream 220.

To mitigate interference at the UE in scenarios such as the one described above in FIG. 1, the LTE standard (up to Release-11) defines an Almost Blank Subframe (ABS) that can be scheduled by a serving base station in coordination with the interfering base station(s). During the ABS, the interfering base station(s) transmits pilot and control information only (data tones are left blank, hence the naming of Almost Blank Subframe). The serving base station signals to the UE the position of the ABS and the cell ID(s) of the interfering base station(s). This allows the UE, when equipped with an interference cancellation receiver (e.g., receiver 200), to decode the pilot/control information transmitted by the interfering base station(s), and then remove the decoded pilot/control information from the received signal.

Thus, the ABS framework enables the serving base station to provide the UE with periods of reduced interference and higher signal-to-interference ratio (SIR). However, the ABS framework comes at the expense of the interfering base station(s) having to halt data transmission during the ABS. This reduces the downlink throughput provided to UEs served by the interfering base station(s).

Embodiments, as further described below, provide a framework for assisting UEs reduce interference from interfering base station(s), without degrading the downlink throughput of the interfering base station(s). Specifically, embodiments recognize that certain network conditions (corresponding to specific combinations of respective transmission parameters of the serving base station and the interfering base station(s)) can be favorable to interference suppression at the UE.

For instance, the LTE standard (which is incorporated herein by reference in its entirety) defines various different transmission modes (TMs) (TM1 through TM10) that can be used by a base station on a per user (UE) basis. For example, modes TM1 and TM2 apply the same complex transmission weight on data and cell-specific pilots on per transmit port basis. Modes TM4 and TM6 include pre-coding of data tones within a Physical Resource Block (PRB) by a user specific pre-coder matrix of a given rank. Mode TM3 circulates a fixed set of predefined pre-coders of a given rank across data tones within a given user allocation. Modes TM5, TM7, TM8 and TM9 apply beamforming of a given rank to both data and user specific pilot tones within a given user allocation.

Certain combinations of TMs (at the serving base station and the interfering base station) can result in network conditions favorable to interference suppression at the UE. For example, any combination of TM modes for the serving base station and the interfering base station from the set (TM5, TM7, TM8, and TM9) is generally desirable for interference suppression at the UE. Other desirable combinations include, for example, the combination TM2, TM3 with the added conditions of time synchronization and non-colliding pilots for the serving base station and the interfering base station.

As would be understood by a person of skill in the art based on the teachings herein, favorable combinations of transmission parameters are not limited to combinations of TMs. According to embodiments, combinations of transmission parameters can include any (value/setting/mode) combinations of one or more of transmission mode (TM), transmission power level, modulation scheme, coding scheme, pilot timing and/or structure, frame structure, and resource (e.g., PRB) allocation mode of the serving base station and/or the interfering base station(s).

Generally, the UE is either unable or requires significant processing to determine or anticipate on its own the parameters related to the interfering transmission. For example, the UE might be able to estimate/guess the modulation order of the interfering transmission by incurring some additional complexity and power consumption. This information can be used in decoding the interference from the interfering transmitter.

Furthermore, generally, the UE is either unable or requires significant processing to determine or anticipate on its own the occurrence of a network condition favorable to interference suppression. For example, TMs are dynamically selected by a base station on a per sub-frame (e.g., every 1 msec) and per PRB basis, which makes them significantly difficult for the UE to track. Further, typically, very few transmission parameter combinations actually result in favorable interference suppression conditions at the UE, making the random occurrence of favorable network conditions at the UE very rare. In addition, testing has shown that applying interference suppression processing during network conditions that are not favorable to interference suppression can degrade receiver performance compared to normal processing (without interference suppression processing). This precludes operating the UE with active interference suppression at all time as a solution for reducing interference at the UE.

Embodiments, as further described below, provide a framework for enabling a UE equipped with an interference cancellation capable receiver to apply interference suppression processing to enhance receiver performance. In one embodiment, the framework includes an interference suppression (IS) time and frequency (time/frequency) zone, which can be scheduled by a serving base station or another higher level network controller (with or without coordination with the interfering base station(s)) and signaled to the UE. The IS time/frequency zone is defined in terms of specific time and frequency resources. According to embodiments, the IS time/frequency zone can be defined in terms of resource elements (in LTE, a resource element is one OFDM carrier for the duration of one OFDM symbol), in terms of LTE slots (0.5 msec), in terms of physical resource blocks (PRBs) (in LTE, a PRB is 12 OFDM subcarriers for the duration of an LTE slot), in terms of an LTE subframe (2 LTE slots of 1 msec), and/or using any other representation/combination of time and frequency resources. Time and/or frequency resources of an IS time/frequency zone may or may not be contiguous. In an embodiment, the IS time/frequency zone includes an interference suppression subframe (ISS) over one or more OFDM sub-carriers.

In embodiments, the IS time/frequency zone coincides with a network condition favorable to interference suppression at the UE, and thus can be used by the UE to apply interference suppression processing with positive effect. Network conditions favorable to interference suppression at the UE can be determined theoretically, from simulation, and/or from actual testing. In an embodiment, the serving base station coordinates with the interfering base station(s) to create a network condition favorable to interference suppression at the UE during the IS time/frequency zone. In one embodiment, this includes the serving base station coordinating with the interfering base station(s) to set (and/or fix) their respective transmission parameters during the IS time/frequency zone. In another embodiment, the serving base station opportunistically schedules the IS time/frequency zone for the UE whenever it determines favorable transmission parameters being used or scheduled for use by the interfering base station(s). The UE applies interference suppression processing within the IS time/frequency zone, thereby improving receiver performance. Outside the time/frequency zone, the UE may disable interference suppression processing so as not to degrade receiver performance.

In another embodiment, the IS time/frequency zone coincides with a network condition that is fixed and known which facilitates interference suppression at the UE, and thus can be used by the UE to apply interference suppression processing with less effort and processing. In one embodiment, this includes the serving base station coordinating with the interfering base station(s) to set (and/or fix) or to inform them of their respective transmission parameters during the IS time/frequency zone. In another embodiment, the serving base station opportunistically schedules the IS time/frequency zone for the UE whenever it determines favorable transmission parameters (known by the UE) being used or scheduled for use by the interfering base station(s). The UE applies interference suppression processing within the IS time/frequency zone, thereby improving receiver performance. Outside the time/frequency zone, the UE may disable interference suppression processing so as not to degrade receiver performance.

In the following, example embodiments of the interference suppression framework of the present disclosure are described. For the purpose of illustration only and not limitation, some of the embodiments will be described with reference to example environment 100 described in FIG. 1 and example receiver 200 described in FIG. 2.

Figure 3:
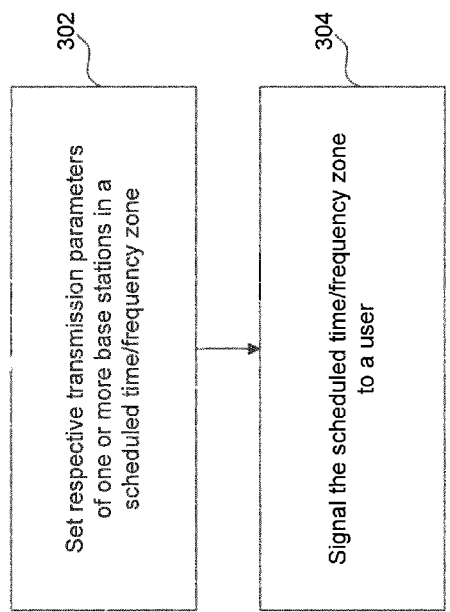
FIG. 3 illustrates an example process for setting up an interference suppression zone according to an embodiment.

FIG. 3 illustrates an example process 300 for setting up an interference suppression (IS) time/frequency zone according to an embodiment. Example process 300 is provided for the purpose of illustration only and is not limiting of embodiments. Example process 300 can be performed by one or more cellular network elements, including, for example, an eNodeB or base station, such as eNodeB 102. Example process 300 can also be performed by a higher level network controller that can communicate with base stations. For the purpose of discussion, a base station performing process 300 or one for which process 300 is performed to benefit a UE that it serves is referred to as the serving base station, and a user for which benefit process 300 is performed (to assist it reduce interference) is referred to as the assisted user/UE.

As shown in FIG. 3, example process 300 begins in step 302, which includes setting/coordinating respective transmission parameters of one or more interfering base stations in a scheduled IS time/frequency zone. In embodiments, the scheduled IS time/frequency zone includes specifically designated time and frequency resources and may be periodic. In an embodiment, the IS time/frequency zone is scheduled by the serving base station to assist one or more served UEs to reduce interference caused by the one or more interfering base station(s). For example, referring to FIG. 1, eNodeB 102 can schedule an IS time/frequency zone to assist UE 106 to reduce interference caused by eNodeB 104. In another embodiment, the assisted UE(s) corresponding to eNodeBs participating in ISS may feedback a preferred time/frequency zone, which is adopted and then signaled as the scheduled IS time/frequency zone to the UE. In an embodiment, step 302 further includes communicating with the one or more interfering base stations (e.g., using a backhaul network) to set/inform the respective transmission parameters of the one or more interfering base stations and to signal the scheduled time/frequency zone to the one or more interfering base stations.

In an embodiment, the one or more interfering base station(s) together with the serving base station form an interference suppression (IS) base station (BS) set. In one embodiment, the IS BS set is formed by its respective members. For example, in FIG. 1, eNodeB 102 may negotiate (e.g., via backhaul network link 110) with eNodeB 104 that it deems interfering (e.g., to UE 106) to form an IS BS set. In another embodiment, the IS BS set is determined by another entity of the cellular network (e.g., network planning) and signaled to the IS BS set members. For example, in FIG. 1, eNodeB 104 can be assigned to an IS BS set that includes eNodeB 102 based on its relative location to eNodeB 102. In another embodiment, feedback from UEs may be used to form IS BS sets.

According to embodiments, IS BS sets can have static or dynamic memberships, and can be formed for determined periods of time or on an ad-hoc basis. In an embodiment, a base station can join or leave an IS BS set as desired. In another embodiment, the base station can be part of one or more IS BS sets. For example, the base station can be part of multiple IS BS sets corresponding respectively to multiple assisted UEs and/or to multiple geographic sectors of its coverage area. For example, assuming that eNodeB 102 also serves UE 108 in FIG. 1, eNodeB 102 can be part of two IS BS sets, one set up for UE 106 and the other set up for UE 108. The two IS BS sets can include the same or different members.

In an embodiment, any member of an IS BS set may take advantage of the IS framework described herein to schedule IS time/frequency zones for the UEs that it serves. In another embodiment, only the base station that initiates the formation of the IS BS set (or additionally IS BS set members that are given explicit permission) can use the IS framework. In an embodiment, all members of an IS BS set are required to cooperate by setting their respective transmission parameters (e.g., as determined by the base station scheduling the IS time/frequency zone) within a scheduled IS time/frequency zone. In another embodiment, the cooperation of a base station within a scheduled IS time/frequency zone may be optional even though it forms part of an IS BS set. For example, interference due to the base station may be below a certain threshold or traffic from the base station may be sufficiently low that its cooperation is not required.

In an embodiment, a BS may not know that it is part of an IS BS set. As an example, in opportunistically scheduling of an IS time/frequency zone by a BS, the other BS(s) are not participating in IS zone and therefore they are un-aware of the IS zone. Only the BS scheduling the IS time/frequency zone knows the IS BS set in this case.

According to embodiments, setting a transmission parameter may include assigning a value to the parameter, selecting a mode/scheme for the parameter, and/or setting properties associated with the parameter. In an embodiment, the transmission parameters of the interfering base station(s) that may be set include one or more of transmission mode (TM), transmission power level, modulation scheme, coding scheme, pilot timing and/or structure, frame structure, resource (e.g., PRB) allocation mode, and any other parameter which setting can facilitate interference suppression at the assisted UE. Alternatively, in another embodiment, step 302 does not include the serving base station setting or adjusting its transmission parameters within the IS time/frequency zone, and only includes setting the respective transmission parameters of the interfering base station(s).

Returning to FIG. 3, in an embodiment, step 302 further includes selecting transmission parameters of the serving base station (which is scheduling the IS time/frequency zone) within the scheduled IS time/frequency zone to enhance interference suppression at the UE within the scheduled IS time/frequency zone. In an embodiment, the transmission parameters of the serving base station that may be selected include one or more of transmission mode (TM), transmission power level, modulation scheme, coding scheme, pilot timing and/or structure, frame structure, resource (e.g., PRB) allocation mode, and any other parameter which setting can facilitate interference suppression at the assisted UE. Alternatively, in another embodiment, step 302 does not include the serving base station setting or adjusting its transmission parameters within the IS time/frequency zone, and only includes setting the respective transmission parameters of the interfering base station(s).

In one embodiment, the set transmission parameters of the one or more interfering base stations and/or the selected transmission parameters of the serving base station correspond to a known combination of transmission parameters that create a network condition favorable to interference suppression at the assisted UE. Network conditions favorable to interference suppression at the assisted UE can be determined theoretically, from simulation, and/or from actual testing. For example, in one embodiment, the selected combination of transmission parameters includes aligning respective pilot signals (e.g., non-zero power reference signals, zero power reference signals, and/or demodulation reference signals) of the serving base station and the one or more interfering base stations. This allows the assisted UB to estimate the channels from the serving base station and the one or more interfering base stations). In another embodiment, the selected combination of transmission parameters includes setting a transmission power level of the one or more interfering base stations within the scheduled time/frequency zone to enable the assisted UE to decode the interference from the one or more interfering base stations within the scheduled time/frequency zone. In another embodiment, the selected combination of transmission parameters includes setting known modulation orders for serving and/or interfering base stations, so the assisted UE can take advantage of this knowledge in interference cancellation. In an embodiment, different types of IS time/frequency zones can be predefined, with each characterized with an associated combination of transmission parameters. Step 302, accordingly, includes selecting a type of the scheduled IS time/frequency zone.

In an embodiment, the selected combination of transmission parameters is determined via negotiation between the serving base station and the one or more interfering base stations. For example, the selected combination may be negotiated such that more than one base station (e.g., the serving base station and an interfering base station) can use the scheduled IS time/frequency zone (or a different IS zone) for the benefit of a respective assisted UE. In another embodiment, the selected combination of transmission parameters is determined exclusively by the serving base station and only communicated to the one or more interfering base stations (who are required to abide by it, in an embodiment). Feedback from UEs (e.g., assisted UE) may or may not be used to determine the selected combination of transmission parameters. In another embodiment, the scheduled time/frequency zone (e.g., details of the time/frequency resources that comprise the zone, such as values, sizes, etc., periodicity of the time/frequency zone, etc.) can be negotiated or determined exclusively by the serving base station. In another embodiment, the selected combination of transmission parameters is determined by the UE and communicated, for example, to its serving base station or a high level network controller performing process 300.

Returning to FIG. 3, after setting the respective transmission parameters of the one or more interfering base stations for the scheduled IS time/frequency zone in step 302, process 300 proceeds to step 304, which includes signaling the scheduled IS time/frequency zone to the user or assisted UE. In other embodiments, step 302 may be performed concurrently with or after step 304.

In an embodiment, step 304 further includes signaling the scheduled IS time/frequency zone to the assisted UE using a radio resource control (RRC) channel of the serving base station. In an embodiment, a bitmap as further described below with reference to FIG. 5 can be used to signal the scheduled IS time/frequency zone to the UE. In another embodiment, the scheduled IS time/frequency zone repeats at known intervals and repeatedly uses the same frequency resources, and thus needs to be signaled only one to the UE at setup. The base station may then adjust the IS time/frequency zone or turn off IS assistance when appropriate (e.g., UE is no longer within range of interfering base stations).

In another embodiment, step 304 further includes signaling a portion (or all) of the set transmission parameters of the one or more interfering base stations and/or the selected transmission parameters of the serving base station to the assisted UE. In another embodiment, the set transmission parameters of the one or more interfering base stations and/or the selected transmission parameters of the serving base station can be pre-defined for the assisted UE and the signaling corresponding to the IS time/frequency zone triggers using those parameters. The signaled information allows the UP to better decode the interference caused by the one or more interfering base stations using its receiver. For example, in an embodiment, the serving base station signals to the UE the modulation order (e.g., QPSK, 16-QAM, etc.) used by the one or more interfering base stations within the scheduled IS time/frequency zone. With knowledge of their respective cell IDs, the UE can use this information to decode the interference from the interfering base stations and to cancel it out using its receiver.

Figure 4:
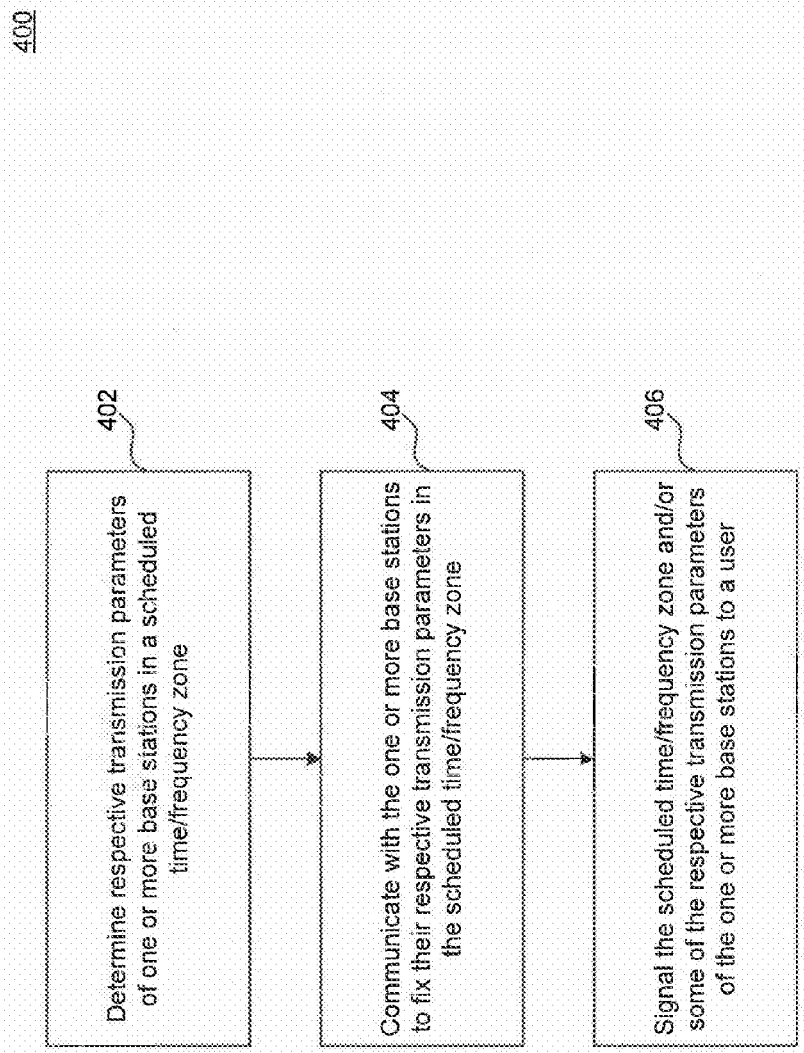
FIG. 4 illustrates another example process for setting up an interference suppression zone according to an embodiment.

FIG. 4 illustrates another example process 400 for setting up an IS time/frequency zone according to an embodiment. Example process 400 is provided for the purpose of illustration only and is not limiting of embodiments. Example process 400 can be performed by one or more cellular network elements, including, for example, an eNodeB or base station, such as eNodeB 102. Example process 400 can also be performed by a higher level network controller that can communicate with base stations. For the purpose of discussion, a base station performing process 400 or one for which process 400 is performed to benefit a UE that it serves is referred to as the serving base station, and a user for which benefit process 400 is performed (to assist it reduce interference) is referred to as the assisted user/UE.

As shown in FIG. 4, example process 400 begins in step 402, which includes determining respective transmission parameters of one or more interfering base stations within the scheduled IS time/frequency zone. In an embodiment, step 402 can be performed by the serving base station by communicating with each of the one or more interfering base stations (or another entity of the cellular network, e.g. UE) to determine the transmission parameters being used or intended to be used by the serving base station and/or the one or more interfering base stations within the scheduled IS time/frequency zone. Step 402 may further include the serving base station determining its own transmission parameters during the scheduled IS time/frequency zone.

Subsequently, step 404 includes communicating with the one or more interfering base stations to fix (maintain fixed) their respective transmission parameters within the IS scheduled time/frequency zone. In an embodiment, this includes having the one or more interfering base stations fix their respective transmission parameters according to the transmission parameters determined in step 404. In other embodiments, steps 402 and 404 may be performed in a single step, whereby the serving base station communicates with the one or more interfering base stations to determine and fix their respective transmission parameters within the IS scheduled time/frequency zone.

Finally, step 406 includes signaling the scheduled IS time/frequency zone and/or some (or all) of the respective transmission parameters of the serving base station and/or the one or more interfering base stations to the assisted UE. In an embodiment, the UE has a pre-defined set of stored transmission parameters and the signaling of the IS time/frequency zone triggers the use of the stored set of transmission parameters (without sending the parameters to the assisted UE). Signaling in step 406 can be done as described above in step 304 of example process 300, for example.

It is noted that according to example process 400, the serving base station does not request that the one or more interfering base stations adjust their respective transmission parameters, but only to maintain them fixed for the scheduled IS time/frequency zone. Accordingly, in an embodiment, this process may require less communication between the base stations to set up the IS time/frequency Zone than example process 300, but may result in less favorable interference suppression conditions at the UE. These conditions can he remedied by signaling more information about the fixed transmission parameters of the interfering base stations to the UE in step 406.

Figure 5:
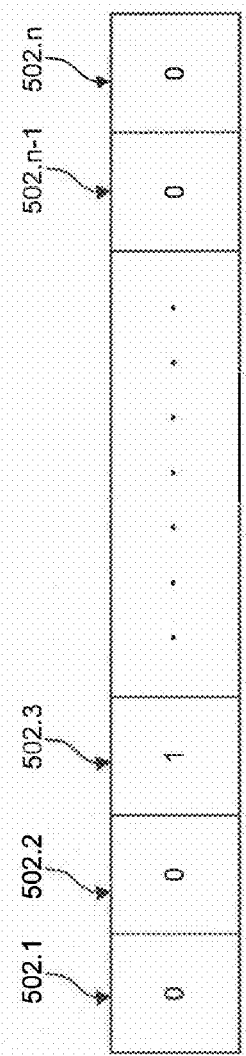
FIG. 5 illustrates an example bitmap for signaling an interfering suppression zone to a user according to an embodiment.

FIG. 5 illustrates an example bitmap 500 for signaling an IS time/frequency zone to a UE according to an embodiment. Example bitmap 500 is provided for the purpose of illustration only and is not limiting of embodiments. Specifically, bitmap 500 can be used to signal an IS time/frequency zone comprised of an interference suppression subframe (ISS) (1 msec over one or more OFDM subcarriers). Bitmap 500 includes n bits, with each bit corresponding to one LTE subframe. A bit having a value of 1, such as bit 502.3 in FIG. 5, indicates that its corresponding subframe is an ISS subframe.

Bitmap 500 can be of any length, which is configurable according to embodiments. For example, bitmap 500 can be 40-bit long and can be signaled to the UE every 40 msec. In other embodiments, as mentioned above, the ISS can repeat periodically and therefore the bitmap is signaled only once to the UE at set up.

Figure 6:
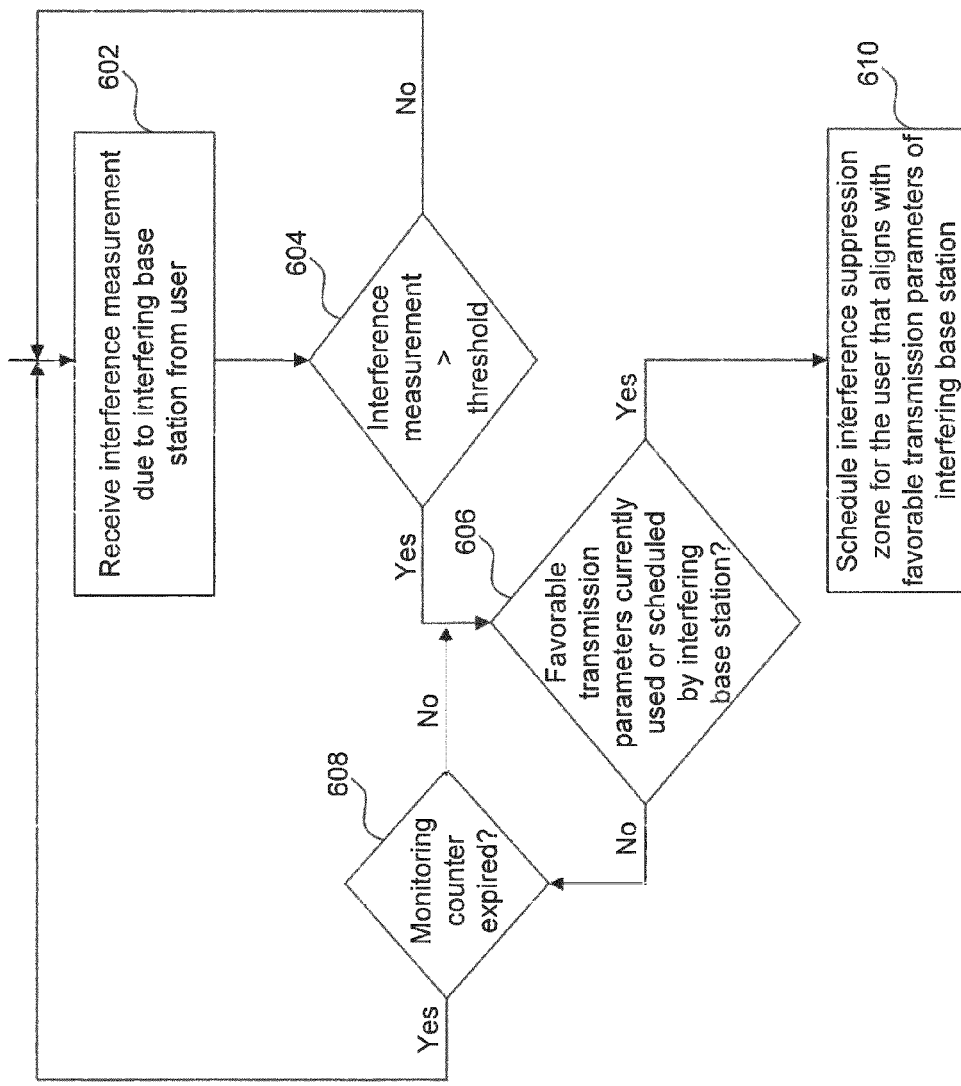
FIG. 6 illustrates another example process for setting up an interference suppression zone according to an embodiment.

FIG. 6 illustrates another example process 600 for setting up an IS time/frequency zone according to an embodiment. Example process 600 is provided for the purpose of illustration only and is not limiting of embodiments. Example process 600 can be performed by one or more cellular network elements, including, for example, an eNodeB or base station, such as eNodeB 102. For the purpose of discussion, a base station performing process 600 is referred to as the serving base station, and a user for which benefit process 600 is performed (to assist it reduce interference) is referred to as the assisted user/UE.

As shown in FIG. 6, process 600 begins in step 602, which includes receiving from the assisted UE an interference measurement due to an interfering base station. In an embodiment, the UE is configured to periodically send interference measurements to its serving base station from one or more interfering base stations. In another embodiment, step 602 includes receiving multiple interference measurements from the UE and averaging the multiple measurements before proceeding to step 604.

Subsequently, step 604 includes determining whether or not the interference measurement is above a predetermined threshold. If the interference measurement is below the predetermined threshold, process 600 returns to step 602. Otherwise, process 600 proceeds to step 606. In an embodiment, the predetermined threshold is selected such that process 600 proceeds to step 606 only when the interference measured by the assisted UE is strong enough to be decoded by the assisted UE.

Step 606 includes monitoring the transmission parameters of the interfering base station to determine whether or not parameters favorable to interference suppression at the assisted UE are used or scheduled to be used (within some future interval) by the interfering base station. If no favorable transmission parameters of the interfering base station are found in step 606, process 600 proceeds to step 608, which includes checking whether or not a monitoring counter has expired. If the answer in step 608 is no, process 600 returns to step 606. Otherwise, process 600 returns to step 602 to receive a new interference measurement from the UE. In an embodiment, the monitoring counter is a function of a time duration for which the interference measurement from the UE can he considered current (unexpired). In an embodiment, the monitor counter is a function of the mobility of the UE.

If favorable transmission parameters of the interfering base station are found in step 606, process 600 proceeds to step 610, which includes scheduling an IS time/frequency zone for the assisted UE to coincide with the favorable transmission parameters of the interfering base station. In an embodiment, step 610 further includes signaling the IS time/frequency zone to the assisted UE and instructing the assisted UE to enable interference suppression within the IS time/frequency zone.

It is noted that according to example process 600, the serving base station does not request that the interfering base station adjust or fix its transmission parameters for the scheduled IS time/frequency zone. The serving base station needs only to be able to monitor the transmission parameters used by the interfering base station. In an embodiment, the serving base station can request to be notified whenever an interfering base station begins or is scheduled to use particular transmission parameters. For example, the serving base station can have a flag sent to it whenever the interfering base station uses a particular TM mode. The flag can be sent from the interfering base station or another entity of the cellular network.

Figure 7:
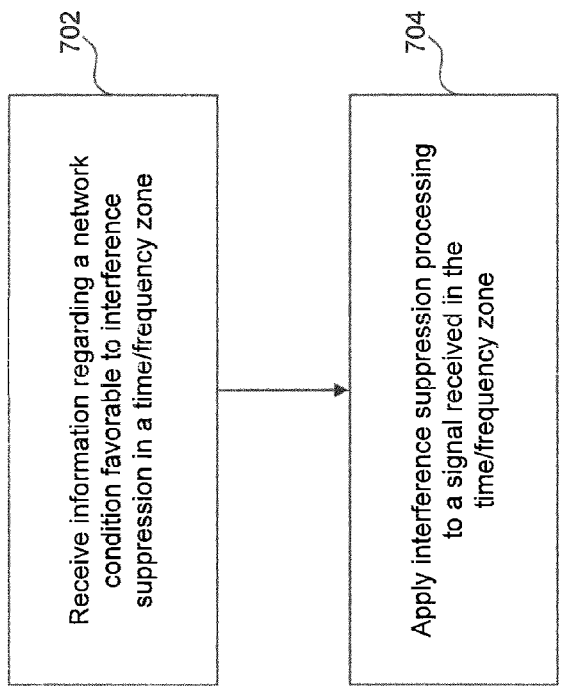
FIG. 7 illustrates an example process of applying interfering suppression at a user equipment according to an embodiment.

FIG. 7 illustrates an example process 700 of applying interfering suppression at a UE according to an embodiment. Example process 700 is provided for the purpose of illustration only and is not limiting of embodiments. Example process 700 can be used by an assisted UE as described above.

As shown in FIG. 7, process 700 begins in step 702, which includes receiving information regarding a network condition favorable to interference suppression in a time/frequency zone. In an embodiment, the time/frequency zone is an inteference suppression zone scheduled by the serving base station of the assisted UE or by coordination among the serving base station and one or more interfereing base stations. The time/frequency zone includes specific time and frequency resources. In an embodiment, the information includes information about the scheduling of the time/frequency zone. In another embodiment, the information further includes information about transmission parameters of the serving base station and/or one or more interfering base stations within the time/frequency zone, which cause the network condition favorable to interference suppression at the UE.

Subsequently, step 704 includes applying, responsive to the received information, interference suppression processing to a signal received in the time/frequency zone. In an embodiment, the signal includes a desired signal from the serving base station and interference due to one or more interfering base stations. In an embodiment, step 704 further includes applying one or more of successive interference cancellation (SIC) processing, interference rejection combining (IRC) processing, and maximum likelihood (ML) interference cancellation within the time/frequency zone.

In an embodiment, process 700 further includes decoding and subtracting the interference from the received signal, resulting in higher interference suppression performance.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method to assist a user equipment served by a serving base station to suppress interference from an interfering base station, comprising:
   setting transmission parameters of the interfering base station in a scheduled time and frequency (time/frequency) zone to enhance interference suppression by the user equipment in the scheduled time/frequency zone, wherein the transmission parameters include a long-term evolution (LTE) standard defined transmission mode (TM) of the interfering base station that is set in the scheduled time/frequency zone based on an LTE standard defined TM of the serving base station in the scheduled time/frequency zone; and
   signaling the scheduled time/frequency zone to the user equipment to enable the user equipment to apply interference suppression processing to a signal received in the scheduled time/frequency zone.

2. The method of claim 1, wherein setting the transmission parameters of the interfering base station comprises:
   determining the transmission parameters of the interfering base station in the scheduled time/frequency zone; and
   communicating with the interfering base station to set its transmission parameters in the scheduled time/frequency zone to the determined transmission parameters.

3. The method of claim 1, further comprising;
   selecting transmission parameters of the serving base station in the scheduled time/frequency zone to enhance interference suppression by the user equipment in the scheduled time/frequency zone.

4. The method of claim 3, wherein the set transmission parameters of the interfering base station and the selected transmission parameters of the serving base station correspond to a known combination of transmission parameters favorable to interference suppression by the user equipment.

5. The method of claim 3, further comprising:
   receiving at least one of an indication of the interfering base station, the transmission parameters of the interfering base station, the transmission parameters of the serving base station, and an indication of a preferred time/frequency zone from the user equipment.

6. The method of claim 1, wherein setting the transmission parameters of the interfering base station comprises:
   aligning respective pilot signals of the serving base station and the interfering base station in the scheduled time/frequency zone.

7. The method of claim 1, wherein setting the transmission parameters of the interfering base station comprises:

setting a transmission power level of the interfering base station in the scheduled time/frequency zone to enable the user equipment to decode the interference from the interfering base station in the scheduled time/frequency zone.

8. The method of claim 1, wherein setting the transmission parameters of the interfering base station comprises:
selecting a type of the scheduled time/frequency zone from a predefined set of types of the time/frequency zone, wherein the transmission parameters of the interfering base station are associated with the selected type of the scheduled time/frequency zone.

9. The method of claim 1, wherein signaling the scheduled time/frequency zone to the user equipment comprises signaling the scheduled time/frequency zone to the user equipment using a radio resource control (RRC) channel of the serving base station.

10. The method of claim 1, further comprising:
signaling to the user equipment a portion of the set transmission parameters of the interfering base station.

11. The method claim of 1, wherein the LTE standard defined TM of the interfering base station is set in the scheduled time/frequency zone to be TM5, TM7, TM8, or TM9 based on the LTE standard defined TM of the serving base station being TM7, TM8, or TM9 in the scheduled time/frequency zone.

12. A method performed by a base station to assist a user equipment to suppress interference from an interfering base station, comprising:
monitoring transmission parameters of the interfering base station, wherein the transmission parameters include a long-term evolution (LTE) standard defined transmission mode (TM); and
scheduling an interference suppression (IS) zone for the user equipment when the transmission parameters of the interfering base station are favorable to interference suppression by the user equipment,
wherein the transmission parameters of the interfering base station are favorable to interference suppression by the user equipment when the LTE standard defined TM of the interfering base station aligns in time with a particular LTE standard defined TM of the serving base station.

13. The method of claim 12, wherein the LTE standard defined TM of the interfering base station is TM5, TM7, TM8, or TM9 and the particular LTE standard defined TM of the serving base station is TM5, TM7, TM8, or TM9.

14. The method of claim 12, wherein scheduling the IS zone for the user equipment comprises:

signaling the IS zone to the user equipment; and
instructing the user equipment to enable interference suppression during the IS zone.

15. The method of claim 12, further comprising:
receiving from the user equipment an interference measurement due to the interfering base station,
wherein said monitoring is responsive to the interference measurement being above a predetermined threshold.

16. The method of claim 12, wherein the monitored transmission parameters of the interfering base station correspond to current or future transmission parameters of the interfering base station.

17. A method of interference suppression at a user equipment, comprising:
receiving from a serving base station information regarding a network condition favorable to interference suppression by the user equipment in a time and frequency (time/frequency) zone, wherein the network condition includes a long-term evolution (LTE) standard defined transmission mode (TM) of an interfering base station in the time/frequency zone that is favorable to interference suppression by the user equipment based on an LTE standard defined TM of the serving base station in the time/frequency zone; and
applying, by the user equipement and responsive to the received information, interference suppression processing to a signal received in the time/frequency zone.

18. The method of claim 17, wherein the network condition corresponds to a known combination of transmission parameters of the base station and the interfering base station.

19. The method of claim 17, wherein receiving the information comprises receiving a scheduling of the time/frequency zone.

20. The method of claim 17, wherein applying the interference suppression processing comprises applying one or more of successive interference cancellation (SIC) processing, interference rejection combining (IRC) processing, and maximum likelihood (ML) interference cancellation.

21. The method of claim 17, wherein receiving the information comprises receiving at least one transmission parameter of the interfering base station associated with the network condition.

22. The method of claim 17, wherein receiving the information comprises receiving a scheduling of the time/frequency zone over a radio resource control (RRC) channel of the base station.

23. The method of claim 17, wherein the LTE standard defined TM of the interfering base station is TM5, TM7, TM8, or TM9 and the LTE standard defined TM of the serving base station is TM5, TM7, TM8, or TM9.

* * * * *

UNITED STATES PATENT AND TRADEMARK OFFICE
CERTIFICATE OF CORRECTION

PATENT NO. : 9,462,593 B2
APPLICATION NO. : 13/838387
DATED : October 4, 2016
INVENTOR(S) : Tujkovic et al.

It is certified that error appears in the above-identified patent and that said Letters Patent is hereby corrected as shown below:

In the Claims

In Column 12, Line 45, replace "comprising;" with --comprising:--.

In Column 13, Line 25, replace "being TM7, TM8" with --being TM5, TM7, TM8--.

Signed and Sealed this
Twenty-seventh Day of March, 2018

Andrei Iancu
*Director of the United States Patent and Trademark Office*